April 22, 1969 S. F. ARANYI ET AL 3,440,616

DATA STORAGE ACCESS CONTROL APPARATUS FOR A MULTICOMPUTER SYSTEM

Original Filed Nov. 16, 1965

INVENTORS
S.F. ARANYI
J. P. BARLOW
L. L. RAKOCZI
M.A. TORFEH
BY

United States Patent Office 3,440,616

Patented Apr. 22, 1969

3,440,616

DATA STORAGE ACCESS CONTROL APPARATUS FOR A MULTICOMPUTER SYSTEM

Steven F. Aranyi, Woburn, Mass., Jesse P. Barlow, Reseda, Calif., Laszlo L. Rakoczi, Phoenix, Ariz., and Mark A. Torfeh, Tarzana, Calif., assignors to General Electric Company, a corporation of New York Continuation of application Ser. No. 508,168, Nov. 16, 1965. This application May 16, 1966, Ser. No. 550,562

Int. Cl. G06f *1/02, 15/16*

U.S. Cl. 340—172.5 11 Claims

ABSTRACT OF THE DISCLOSURE

A data processing system is disclosed having a plurality of data processors and a plurality of data storage members. Communications of data words, both instructions and operands, between the processors and the storage members is via a data word transmission member which is sequentially connected between a processor and a storage member prepared to communicate with each other. The processor and storage member are connected only long enough to permit the transmission of a data word therebetween.

This application is a continuation of U.S. patent application Ser. No. 508,168, filed Nov. 16, 1965.

This invention relates to multicomputer systems and more particularly to apparatus for exercising management control of a multicomputer system.

A multicomputer system comprises a plurality of data processors, a plurality of data storage units, and a plurality of input devices and output devices. The data processors process data by executing separate programs or program parts simultaneously. The data storage units store data to be processed, data which is the result of processing, and programs for controlling the processing operations of the data processors. The input devices supply programs and data to be processed and the output devices receive and utilize processed data. Communication must be provided for the data processors to receive programs and data to be processed from the data storage units and to transmit processed data to the data storage units. In the multicomputer system described one or more input/output processors provide common control and data transmission centrals for a plurality of input devices and a plurality of output devices. Accordingly, communication must also be provided for the input/output processors to transfer programs and data to be processed to the data storage units from the input devices and to transfer processed data from the data storage units to the output devices.

The apparatus of the instant invention provides a portion of the management control for such a multicomputer system. Generally, management control of the multicomputer system described comprises expeditiously supplying data to be processed and the programs providing the required data processing functions to the data processors, and efficiently controlling the output devices to receive and utilize the processed data. Such management control is effected by providing and controlling all required communications between the processors and data storage units; by providing for the assignment of programs to data processors for execution in accordance with the required urgencies for execution of the different programs, the availability of the required input and output devices, the availability of the required data storage space in the data storage units, and the relative capabilities of the data processors for executing the different programs; by providing termination of the programs nearing completion and their replacement with other waiting programs; by providing assignment of specific data storage units for programs to be executed; by providing assignment of specific input and output devices for programs to be executed, and initiation and termination of data transfer operations by these devices; by providing the corrective functions required when program or data errors are detected by the processors, or when the processors become partially or totally inoperative; etc.

Each data processor of a multicomputer system executes a program separately from the programs being executed by the other data processors. The program comprises a set of instructions, each instruction specifying a discrete type of processing operation. A data processor executes a program by sequentially responding to each of the instructions of the program to perform the corresponding operations. The data processor obtains the instructions of a program in sequence from a set of storage locations, or "cells," in the data storage system, which comprises the plurality of data storage units. Each such cell is identified by a unique identification, termed an "address." Thus, in obtaining the instructions of a program in proper sequence the data processor supplies the corresponding addresses in sequence. Additionally, many of the instructions during execution require the data processor to further communicate with the data storage system, either to obtain a data item on which the data processor is to perform an operation or to store a data item which is the result of an operation. Accordingly, each instruction requiring the transfer of a data item between the data processor and the data storage system must also identify the cell which is to supply or receive the data item. Therefore, each program requires a set of cells for storing and supplying data items to be processed by the program, for receiving and storing data items which are the result of processing operations performed by the program, and for storing the instructions of the program, many of the stored instructions comprising an identification of a cell in the set.

Each input/output processor of a multicomputer system performs control and data transmission operations for its respective set of input and output devices separately from the operations being performed by the other input/output processors and separately from the programs being executed by the data processors. An input/output processor controls the storage of the data items provided by each of its associated input devices in a respective set of cells of the data storage system. Thus, in transmitting the data items supplied in succession by a particular input device an input/output processor supplies in sequence addresses of the cells of a cell set for receiving and storing the data items. Similarly, data items for transmission to each of its associated output devices are obtained by the input/output processor from a respective set of cells of the data storage system. Thus, in transmitting data items in succession to a particular output device an input/output processor also supplies in sequence addresses of the cells of the cell set storing the data items.

In providing the management control functions effecting transfer of data items and instructions between the plural processors and the plural data storage units of a multi-computer system, it is desirable to employ apparatus which satisfies the transfer requirements as rapidly and efficiently as possible, yet is not unduly costly and complex. One manner by which relative economy and simplicity can be achieved is for such apparatus to utilize to advantage the different durations of the separate phases in the transfer of data items and instructions between processors and data storage units.

For convenience herein both data items and instructions are termed "data words."

Two significant phases occurring in the transfer of each data word between a processor and a data storage unit of the multicomputer system are (a) the data storage unit preparation phase, and (b) the data word transmission phase.

During the preparation phase the address supplied by the requesting processor is prepared for the selected data storage unit; the prepared address and certain control signals are transmitted to the selected data storage unit; and the selected data storage unit, upon receipt of the prepared address and control signals, initiates the type of operation directed by the control signals. If the control signals denote that the data storage unit is to supply a data word for the requesting processor, the data storage unit retrieves the data word stored in the cell identified by the prepared address and supplies signals representing the data word at output terminals of the data storage unit. If, on the other hand, the control signals denote that the data storage unit is to storage a data word provided by the requesting processor, the data storage unit prepares to receive signals representing the data word at input terminals thereof and prepares to insert the data word, upon receipt, into the cell identified by the prepared address.

During the transmission phase the data word is transmitted between the requesting processor and the selected data storage unit in a direction determined by the control signals. If the data word for transmittal is to be supplied by the data storage unit, the data word is thereupon transmitted from the output terminals of the selected data storage unit to the requesting processor. If the data word for transmittal is to be supplied by the requesting processor, the data word is thereupon transmitted from the requesting processor to the input terminals of the selected data storage unit.

The duration of the preparation phase is substantially longer than the duration of the transmission phase, normally the preparation phase duration being several times as long as the transmission phase duration. Accordingly, where several processors simultaneously request communication with respective data storage units, most efficient and rapid operation of the multicomputer system would be impeded if the management control apparatus had only the capability of effecting, at one time, the preparation phase for a single processor, since the preparation phases of the simultaneously requesting processors would have to be provided sequentially. Instead, it is desirable to provide management control apparatus for enabling a plurality of processors to substantially simultaneously communicate with respective data storage units.

Therefore, it is an object of this invention to provide improved management control apparatus for providing communication between the processors and data storage units of a multicomputer system.

Another object of this invention is to provide management control apparatus for providing simultaneous communication between the plural processors and the plural data storage units of a multicomputer system.

In the above-described desirable management control apparatus one address channel must be provided for each of the processors permitted simultaneous communication with the data storage system, inasmuch as the prepared address must be made available to a data storage unit during most of the preparation phase. However, as described heretofore, since the preparation phase is substantially longer than the transmission phase, a data word channel for transmitting a data word between a requesting processor and a selected data storage unit is not required for the full duration of each preparation phase. Accordingly, it is desirable to provide a more economical and simpler management control apparatus, wherein a data word transmission channel is not allocated to a processor-data storage unit pair for the entire duration of the preparation phase, but only at the time a data word is ready to be transmitted between the elements of such pair, and is allocated only for so long as is required to complete the transmission phase for the pair.

Therefore, another object of this invention is to provide improved management control apparatus for effecting simple and economical communication between the plural processors and the plural data storage units of a multi-computer system.

Another object of this invention is to allocate apparatus for transmitting a data word between a processor and a data storage unit of a multicomputer system only at such time as the data word is ready for transmission.

The foregoing objects are achieved, according to one embodiment of the instant invention, by providing, in a multicomputer data processing system, storage access control apparatus for effecting simultaneous data storage unit preparation phases whenever more than one processor requests communication with a data storage unit and for allocating a single data word transmission member in succession to each of the data storage units to effect the data word transmission phase as each such data storage unit is ready to receive or to accept a data word. The storage access control apparatus is coupled to all data processors, input/output processors, and data storage units. The data word transmission member is also coupled to all data processors, input/output processors, and data storage units and is adapted to transfer a data word between any selected two of the components to which it is coupled, under direction of the storage access control apparatus.

The storage access control apparatus comprises a separate address channel for each processor. As each processor requires communication with the data storage system, it supplies to the storage access control apparatus control signals denoting the type of operation required of the data storage system and signals representing the address of a cell in the data storage system. The storage access control apparatus translates the received addresses into corresponding prepared addresses. Each address channel receives and stores the prepared address for a respective processor, the prepared address identifying a particular data storage unit and a particular cell in such storage unit. Each address channel thereupon transmits the prepared address to the corresponding identified data storage unit and also directs the corresponding control signals to such data storage unit. Upon receipt of the prepared address and the control signals the data storage unit commences the type of operation directed by the control signals.

A sequential control means in the storage access control apparatus delivers in sequence output signals corresponding to each data storage unit for which a prepared address is being stored in the storage access control apparatus. Each such output signal, in conjunction with the control signals provided by the corresponding requesting processor, thereupon controls the data word transmission member to transfer a data word between the requesting processor and the data storage unit represented by the output signal, the direction of transmission being determined by the control signals. Immediately following each such transfer, the sequential control means is enabled to deliver the next sequential output signal.

Accordingly, an efficient and rapidly operating, but relatively simple and inexpensive, multicomputer system is implemented by providing substantially simultaneous execution of the address preparation phases for all processors requesting communication with the data storage system, but by providing sequential execution of the data word transmission phase for all requesting processors following completion of the address preparation phases.

Certain portions of the apparatus herein described are not of our invention, but are the invention of:

J. E. Belt, L. A. Hittel, G. R. Hope, Jr., E. J. Porcelli, and L. L. Rakoczi, as defined by the claims of their application, Ser. No. 551,355, filed May 19, 1966, entitled: Apparatus Providing Inter-Processor Communication and Program Control in a Multicomputer System.

S. F. Aranyi, J. P. Barlow, R. Barton, L. L. Rakoczi, and M. A. Torfeh, as defined by the claims of their application, Ser. No. 551,657, filed May 20, 1966, entitled: Multi-Word Storage Access Control Apparatus for a Data Processing System.

J. P. Barlow, C. R. Jones, and J. L. Kerr, as defined by the claims of their application, Ser. No. 559,305, fi'ed June 21, 1966, entitled: Apparatus Providing a Unique Decision Signal for Concurrent Interrogation Signals.

W. W. Chu and N. R. Crain, as defined by the claims of their application, Ser. No. 559,497, filed June 22, 1966, entitled: Apparatus for Providing Controllable Delays.

S. F. Aranyi, J. P. Barlow, E. J. Porcelli, L. L. Rakoczi, and M. A. Torfeh, as defined by the claims of their application, Ser. No. 568,343, filed July 27, 1966, entitled: Interprocessing Multicomputer Systems.

J. E. Belt, L. A. Hittel, and L. L. Rakoczi, as defined by the claims of their application, Ser. No. 612,560, filed Jan. 30, 1967, entitled: Apparatus Providing Identification of Programs in a Multiprogrammed Data Processing System.

J. P. Barlow, R. Barton, L. L. Rakoczi, and M. A. Torfeh, as defined by the claims of their application, Ser. No. 618,076, filed Feb. 23, 1967, entitled: Data Storage Access Control Apparatus for a Multicomputer System.

J. P. Barlow, R. Barton, E. J. Porcelli, L. L. Rakoczi, and M. A. Torfeh, as defined by the claims of their application, Ser. No. 619,377, filed Feb. 28, 1967, entitled: Data Storage Access Control Apparatus for a Multicomputer System.

S. F. Aranyi, J. P. Barlow, L. L. Rakoczi, L. A. Hittel, and M. A. Torfeh, as defined by the claims of their application, Ser. No. 623,284, filed Mar. 15, 1967, entitled: Data Storage Access Control Apparatus for a Multicomputer System, and J. R. Hudson, L. L. Rakoczi, and D. L. Sansbury, as defined by the claims of their application, Ser. No. 646,-504, filed on or about June 16, 1967, entitled: Program Interruption and Assignment Apparatus in the Multiprogrammed Data Processing System.

All such applications being assigned to the assignee of the present application.

DESCRIPTION OF DRAWINGS

The invention will be described with reference to the accompanying drawings, wherein.

Figure 1:
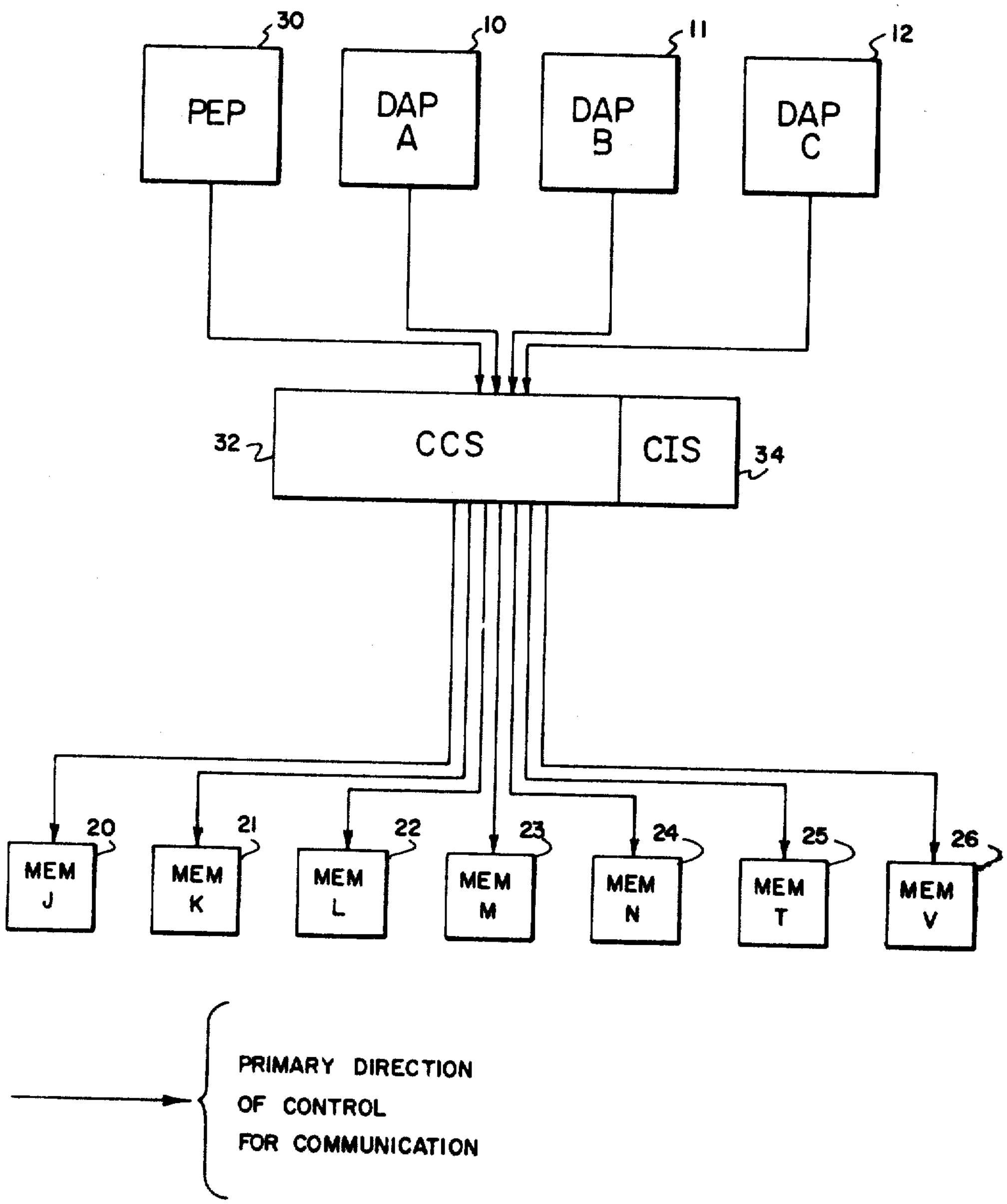
FIGURE 1 is a block diagram of a Multicomputer Data Processing System to which the instant invention is applicable.

For a complete description of the system of FIGURE 1 and of my invention, reference is made to U.S. patent application, Ser. No. 542,768, filed Apr. 15, 1966, entitled "Centrally Controlled Multicomputer System" by Jesse P. Barlow et al., and assigned to the assignee of the present invention. More particularly, attention is directed to FIGURES 2 through 110 of the drawings and to the specification beginning at page B–1, line 5, and ending at page N–46, line 16, inclusive of U.S. patent application, Ser. No. 542,768, which are incorporated herein by reference and made a part hereof as is fully set forth herein.

What is claimed is:

1. A data processing system comprising: a plurality of processors; each of said processors being adapted to execute a sequence of operations for receiving and transmitting data words; an addressable data storage system; a selectively controllable data word transmission member; said processors being adapted to receive data words from said transmission member and to transfer data words to said transmission member, each of said processors supplying a request signal when said processor requires communication with said storage system; said storage system being adapted to receive data words from said transmission member and to transfer data words to said transmission member; a request storage member for receiving said request signals, for storing simultaneously representations of said request signals, and for delivering simultaneously output signals corresponding to the stored representations; and means responsive to the ones of said output signals being delivered simultaneously for controlling said transmission member to provide communication in sequence between the data storage system and the ones of said processors for which corresponding output signals are being delivered.

2. The data processing system of claim 1 wherein said data storage system comprises a plurality of data storage members.

3. For employment with a plurality of processors and a plurality of addressable data storage members, each of said processors being adapted to execute a sequence of operations for receiving and transmitting data words; the combination comprising: a selectively controllable data word transmission member; each of said processors being adapted to receive data words from said transmission member and to transfer data words to said transmission member, each of said processors supplying a request signal when said processor requires communication with one of said storage members; each of said storage members being adapted to receive data words from said transmission member and to transfer data words to said transmission member; a request storage member for receiving said request signals, for storing representations of the data storage members assigned for communication to the processors supplying said request signals, and for delivering output signals corresponding to the stored representations; and means responsive to said output signals for controlling said transmission member to provide communication in sequence between the data storage members corresponding to said output signals and the ones of said processors to which said data storage members are assigned for communication.

4. For employment with a plurality of processors and a plurality of addressable data storage members, each of said processors being adapted to execute a sequence of operations for receiving and transmitting data words; the combination comprising: a selectively controllable data word transmission member; each of said processors being adapted to receive data words from said transmission member and to transfer data words to said transmission member, each of said processors supplying a request signal when said processor requires communication with one of said storage members; each of said storage members being adapted to receive data words from said transmission member and to transfer data words to said transmission member; a request storage member for receiving said request signals, for storing simultaneously representations of the data storage members assigned for communication to the processors supplying said request signals, and for delivering simultaneously output signals corresponding to the stored representations; and means responsive to the ones of said output signals being delivered simultaneously for controlling said transmission member to provide communication in sequence between the data storage members corresponding to said output signals and the ones of said processors to which said data storage members are assigned for communication.

5. For employment with a plurality of data processors and a plurality of addressable data storage members, each of said data processors being adapted to receive data words, to execute a sequence of different processing operations on received data words in response to a corresponding sequence of data words representing instructions, and to generate data words representing the processed results of said operations; the combination comprising: a selectively controllable data word transmission member; each of said processors being adapted to receive data words from said transmission member and to transfer data words to said transmission member, each of said processors supplying a request signal when said processor requires communication with one of said storage members; each of said storage members being adapted to receive data words from said transmission member and to transfer data words to said transmission member; a request storage member for receiving said request signals, for storing representations of the data storage members assigned for communication to the processors supplying said request signals, and for delivering output signals corresponding to the stored representations; and means responsive to said output signals for controlling said transmission member to provide communication in sequence between the data storage members corresponding to said output signals and the ones of said processors to which said data storage members are assigned for communication.

6. A data processing system comprising: a plurality of processors, each of said processors being adapted to execute a sequence of operations for receiving and transmitting data words; a plurality of addressable data storage members; each of said processors supplying a request signal when said processor requires communication with one of said storage members; a request storage member for receiving said request signals, for storing simultaneously representation of the data storage members assigned for communication to the processors supplying said request signals, and for the delivering simultaneously output signals corresponding to the stored representations; means responsive to said simultaneously delivered output signals for initiating simultaneous operations of the corresponding data storage members; a selectively controllable data word transmission member for interconnecting a processor and a data storage member for communicating a data word therebetween; and means responsive to said output signals for controlling said transmission member to provide communication sequentially between the ones of said processor supplying request signals and the ones of said storage members assigned to a processor in response to its request signal.

7. A data processing system comprising: a plurality of processors, each of said processors being adapted to execute a sequence of operations for receiving and transmitting data words; a plurality of addressable data storage members, each of said storage members being responsive to an initiation signal for executing an operation to retrieve and supply a data word stored in a cell thereof or to receive and insert a data word in a cell thereof; each of said processors supplying a request signal when said processor requires communication with one of said storage members; a request storage member for receiving said request signals, for storing simultaneously representations of the data storage members assigned for communication to the processors supplying said request signals, and for delivering simultaneously output initiation signals corresponding to the stored representations; means for simultaneously transmitting said simultaneously delivered initiation signals to the corresponding data storage members; a selectively controllable data word transmission member for interconnecting a processor and a data storage member for communicating a data word therebetween; and means responsive to said output signal for controlling said trannsmission member to provide communication sequentially between the ones of said processor supplying request signals and the ones of said storage members assigned to a processor in response to its request signal.

8. A data processing system comprising: at least one data processor, said processor being adapted to receive data words, to execute a sequence of different processing operations on received data words in response to a corresponding sequence of instructions, and to generate data words representing the processed results of said operations; a plurality of addressable data storage members, each of said storage members being responsive to an initiation signal for executing an operation to retrieve and supply a data word stored in a cell thereof or to receive and insert a data word in a cell thereof; said processor supplying a request signal when said processor requires communication with one of said storage members; a request storage member for receiving said request signals, for storing simultaneously representations of the data storage members designated for response to each of said requests signals, for delivering simultaneously output initiation signals corresponding to the stored representations; and means for simultaneously transmitting said simultaneously delivered initiation signals to the correpsonding data storage members; a selectively controllable data word transmission member for interconnecting a processor and a data storage member for communicating a data word therebetween; and means responsive to said output signals for controlling said data word transmission member to provide communication between a processor supplying a request signal and the data storage member designated to respond thereto as long as required to communicate a data word between the requesting processor and designated data storage member.

9. For employment with a plurality of processors and an addressable data storage system comprising a plurality of data storage members, each of said processors being adapted to execute a sequence of operations for receiving and transmitting data words; the combination comprising: a selectively controllable data word transmission member; said processors being adapted to receive data words from said transmission member and to transfer data words to said transmission member, each of said processors supplying a first signal group symbolically representing an address of a cell in said storage system when said processor requires communication with said storage system; each of said storage members being responsive to a second group for transferring a data word between one of the cells of said storage member and said transmission member, said second signal group representing at least a portion of the actual address of said cell; an address preparation member coupled to said processors to receive each of said first signal groups and responsive thereto for generating a corresponding signal set comprising one of said second signal groups and an identification signal representing one of said storage members; a storage register for each of said processors; means coupled to said address preparation member for transferring each of said signal sets to the one of said registers assigned to the processor supplying the corresponding first signal group; means responsive to the storage of each of said signal sets in said register for initiating operation of the one of said storage members identified by said signal set; and means following said initiation of operation of said storage members for controlling said transmission member to provide communication in sequence between the ones of said processors for which said registers store one of said signal sets and the ones of said storage members identified by said signal sets.

10. For employment with a plurality of processors and a data storage system comprising a plurality of data storage members, each of said processors being adapted to execute a sequence of operations for receiving and transmitting data words; the combination comprising: a selectively controllable data word transmission member; said processors being adapted to receive data words from said transmission member and to transfer data words to said transmission member, each of said processors supplying a first signal group and a control signal when said processor requires communication with said storage system, said first signal group symbolically representing an address of a cell in said storage system and said control signal representing the required direction of said communication; each of said storage members being responsive to a second signal group for transferring a data word between one of the cells of said storage member and said transmission member, said second signal group representing at least a portion of the actual address of said cell; an address preparation member coupled to said processors to receive each of said first signal groups and responsive thereto for generating a corresponding signal set comprising one of said second signal groups and an identification signal representing one of said storage members; a storage register for each of said processors; means coupled to said address preparation member for transferring each of said signal sets to the one of said registers assigned to the processor supplying the corresponding first signal group; means responsive to the storage of each of said signal sets in said registers for initiating operation of the one of said storage members identified by said signal set; and means following said initiation of operation of said storage members and responsive to said control signals for controlling said transmission member to provide communication in sequence between the ones of said processors for which said registers store one of said signal sets and the ones of said storage members identified by said signal sets, the direction of said communication corresponding to said control signals.

11. For employment with a plurality of processors and a plurality of addressable data storage members, each of said processors being adapted to execute a sequence of operations for receiving and transmitting data words; the combination comprising: a selectively controllable data word transmission member; each of said processors being adapted to receive data words from said transmission member and to transfer data words to said transmission member, each of said processors supplying a request signal when said processor requires communication with one of said storage members; each of said storage members being adapted to receive data words from said transmission member and to transfer data words to said transmission member; a request storage member for receiving said request signals, for storing simultaneously representations of the data storage members assigned for communication to the processors supplying said request signals, and for delivering simultaneously output signals corresponding to the stored representations; and means responsive to the ones of said output signals being delivered simultaneously for controlling said transmission member to provide communication in sequence between the data storage members corresponding to said output signals and the ones of said processors to which said data storage members are assigned for communication, said sequence being effected in accordance with respective priorities allocated to the data storage members.

References Cited

UNITED STATES PATENTS

| | | | |
|---|---|---|---|
| 3,323,109 | 5/1967 | Hecht et al. | 340—172.5 |
| 3,319,226 | 5/1967 | Mott et al. | 340—172.5 |
| 3,312,953 | 4/1967 | Wang et al. | 340—172.5 |
| 3,312,951 | 4/1967 | Hertz | 340—172.5 |
| 3,312,943 | 4/1967 | McKindles et al. | 340—172.5 |
| 3,302,182 | 1/1967 | Lynch et al. | 340—172.5 |
| 3,274,561 | 9/1966 | Hallman et al. | 340—172.5 |
| 3,274,554 | 9/1966 | Hopper et al. | 340—172.5 |
| 3,242,467 | 3/1966 | Lamy | 340—172.5 |
| 3,229,260 | 1/1966 | Falkoff | 340—172.5 |
| 3,200,380 | 8/1965 | MacDonald et al. | 340—172.5 |

GARETH D. SHAW, *Primary Examiner.*